United States Patent [19]

Kisou et al.

[11] Patent Number: 4,951,137
[45] Date of Patent: Aug. 21, 1990

[54] IMAGE TRACK DISPLAY APPARATUS

[75] Inventors: Masaaki Kisou, Chiba; Kenji Shimoda, Kanagawa; Kazumasa Ikeda, Kanagawa; Shinji Yoda, Kanagawa; Hisaharu Takeuchi, Saitama, all of Japan

[73] Assignee: Kabushiki Kaisha Toshiba, Kanagawa, Japan

[21] Appl. No.: 331,319

[22] Filed: Mar. 31, 1989

[30] Foreign Application Priority Data

Mar. 31, 1988 [JP] Japan .................................. 63-76599
Mar. 31, 1988 [JP] Japan .................................. 63-78896

[51] Int. Cl.⁵ ........................ H04N 7/18; H04N 5/213
[52] U.S. Cl. .................... 358/125; 358/105; 358/167; 434/369
[58] Field of Search .................... 358/105, 107, 3, 125, 358/22, 167, 166, 36, 37, 330, 340; 352/121; 434/369; 273/DIG. 28

[56] References Cited

U.S. PATENT DOCUMENTS

| | | | |
|---|---|---|---|
| 4,058,836 | 11/1977 | Drewery et al. | 358/167 |
| 4,246,610 | 1/1981 | Takahashi | 358/167 |
| 4,291,333 | 9/1981 | Warnock et al. | 358/36 |
| 4,333,104 | 6/1982 | Geller | 358/23 |
| 4,748,499 | 5/1988 | Ueda | 358/167 |
| 4,807,034 | 2/1989 | Takeuchi et al. | 358/105 |
| 4,833,537 | 5/1989 | Takeuchi et al. | 358/167 |

FOREIGN PATENT DOCUMENTS

51-12369  4/1976  Japan .
59-17580  4/1984  Japan .
62-60877  12/1987  Japan .

Primary Examiner—John K. Peng
Attorney, Agent, or Firm—Finnegan, Henderson, Farabow, Garrett, and Dunner

[57] ABSTRACT

Image track display apparatus including a memory for delaying an image signal by at least one vertical scanning period, a first subtraction circuit for taking a first difference signal between the image signal and its delayed image signal through the memory. The first difference signal includes first and second polarity components, a non-linear processing circuit for multiplying the one polarity component of the first difference signal by K times ($0<K<1$) and for reducing the other polarity component of the first difference signal to the zero value when the other polarity component exceeds a prescribed value, a second subtraction circuit for taking a second difference signal between the output signal of the non-linear processing circuit and the image signal, and a display device for displaying the delayed image signal obtained through the memory circuit.

5 Claims, 8 Drawing Sheets

IN CASE OF
LOW LUMINANCE
BACKGROUND

IN CASE OF
HIGH LUMINANCE
BACKGROUND

IMAGE TRACK DISPLAY APPARATUS

FIELD OF THE INVENTION

The present invention relates generally to an image track display apparatus, and more particularly, to an image track display apparatus for television receivers.

BACKGROUND OF THE INVENTION

Recently, various types of image track display apparatus have been developed. These image track display apparatus are useful for clearly illustrating a track of a specified image moving on a screen of a display device. According to the image track display apparatus, a viewer can see moving tracks of various displayed objects, such as baseballs, golf balls, etc.

Some examples of conventional image track display apparatus will be described in brief below.

The Japanese Patent Application; Tokko-Sho P51-12369 discloses a method for displaying a track of a moving image on a screen by multiplexly synthesizing the corresponding storage moving image information by the method of simultaneous reproduction after erasing the static image information, by extracting only the moving image information and storing the corresponding extraction result in the portion of period of a few frames or a few fields, and by subtracting one frame or one field delay video image signal and a non-delay video image signal.

The Japanese Patent Application; Tokko-Sho P62-48432 discloses an image track display apparatus in a video image enabling to display brightly only the track of the desired moving image by automatically moving the position of the window accompanied by the movement of the moving image.

Japanese Patent Application: Tokko-Sho P62-48433 discloses the image track display apparatus in a television screen so that the simplification of a circuit store's image signals of the moving image detected so as to be designed for being successively superposed aiming at the fact that its image signal has the different signal level from the image signal in the background, being normally that the image of a moving image is like a white ball of baseball or golf, enabling to rightly display only the track of the desired moving image by moving automatically also the position of a window accompanied by the movement of a moving image.

The Japanese Patent Application; Tokko-Sho P62-46107 discloses a processing apparatus of image signal enabling to successively projecting a moving image on a television screen along with its track by sampling a digital image signal, storing a signal of difference between its sampling signal and a delay signal of sampling signal in the first and second storage means, installing the switch circuit to alternately select the signal read out, and designing to successively obtain a signal exceeding the specified level by the switch circuit.

Those conventional image track display apparatus, however, require very complicated constructions for extracting and displaying an image track. Furthermore, those conventional image track display apparatus have problems of reliability and cost of the apparatus, due to the complicated construction.

SUMMARY OF THE INVENTION

It is, therefore, an object of the present invention to provide an image track display apparatus which is able to display a track of a moving image on a screen of display device with a simple construction.

Another object of the present invention is to provide an image track display apparatus which can be used for reducing noise.

In order to achieve the above object, an image track display apparatus according to one aspect of the present invention includes a memory for delaying an image signal by at least one vertical scanning period, a first subtraction circuit for taking a first difference signal between the image signal and its delayed image signal through the memory, the first difference signal including first and second polarity component, a non-linear processing circuit for multiplying the one polarity component of the first difference signal by K times $(0<K<1)$ and for reducing the other polarity component of the first difference signal to the zero value when the other polarity component exceeds a prescribed value, a second subtraction circuit for taking a second difference signal between the output signal of the non-linear processing circuit and the image signal and a display device for displaying the delayed image signal obtained through the memory circuit.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 5 (a) and 5(b) are timing charts for illustrating the operation of the first embodiment;

FIGS. 8 (a), 8(b) and 8(c) are timing charts for illustrating the operation of the second embodiment.

DESCRIPTION OF THE PREFERRED EMBODIMENTS

The present invention will be described in detail with reference to FIGS. 1 through 8. Throughout the drawings, like reference numerals and letters are used to designate same or equivalent elements for the sake of simplicity of explanation.

Before explaining the present invention, a typical noise reducer which is employed in the image track display apparatus according to the present invention will be described in brief.

Figure 1:
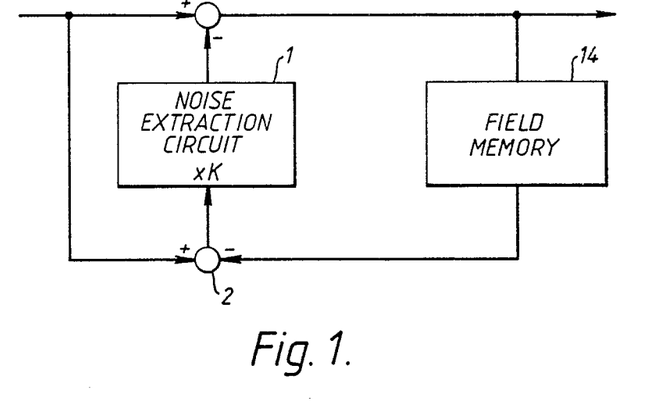
FIG. 1 is a block diagram showing a typical noise reducer.

A noise reducer is generally used for eliminating a noise combined in the image signal. Typically, the noise reducer has a construction as shown in FIG. 1. In FIG. 1, a digital image signal is applied to a noise extraction circuit 1 through a first subtraction circuit 2. The noise extraction circuit 1 multiplies the digital image signal by $(1 < K)$ times. The multiplied image signal output from the noise extraction circuit 1 is combined with a delayed image signal output from a frame memory or a field memory 14. The digital image signal is processed by the memory 14 so that the delayed image signal is obtained. The delayed image signal is multiplied by K times. These image signals multiplied by $(1-k)$ and K times are added to each other.

According to the circuit construction, the noise reducer reduces a noise combined in the image signal. The noise reducing operation will be explained below.

The basic principle of the noise reducer is that since the signal correlation is large, when making the input signal Si and the output signal So, $$
\begin{aligned}
So &= (1-K)\cdot Si_0 + (1-K)\cdot Si_1 \cdot K + \\
&\quad (1-K)\cdot Si_2 \cdot K^2 + \ldots \\
&= (1-K)\cdot(1 + K + K^2 + \ldots)\cdot Si \\
&= (1-K)\cdot \lim \Sigma\, Kl - 1 \cdot Si \\
&\approx (1-K)\cdot \frac{1}{1-k}\cdot Si = Si
\end{aligned}
$$

The correlation of noise components is very small. When an input noise and an output noise are represented as Ni and No, respectively.

$$
\begin{aligned}
No &= (1-K)^2 \cdot Ni_0^2 + (1-K)^2 \cdot Ni_0^2 \cdot K^2 + \\
&\quad (1-K)^2 \cdot Ni_2^2 \cdot K^4 + \ldots \\
&= (1-K)\cdot \sqrt{\frac{1}{1-K}} \cdot Ni \\
&= \sqrt{\frac{(1-K)^2}{1-K}} \cdot Ni,\ (0 < K < 1)
\end{aligned}
$$

Thus, the S/N of $10\cdot\log\sqrt{(1-K)^2/(1-K)}$ is obtained by the noise reducer.

A residual image of the image signal has the time constant T as expressed by the following:

$$T = -S/\ln K$$

wherein S is set to the value of 1/59.94 sec for the field memory, or set to the value of 1/29.97 sec for the frame memory.

Thus, the larger the value of K, the larger the time constant of residual image, and the result is that S/N increases.

If the level of a difference signal e obtained by subtracting the image signal and the delayed image signal by one frame period or if one field period is higher than a prescribed level, it is assumed that the image signal is moving. Then, every frame or field of the image signal is successively added after the image signal is carried out a specified non-linear processing. Therefore, such a noise reducer can be used for the image track display.

Figure 2:
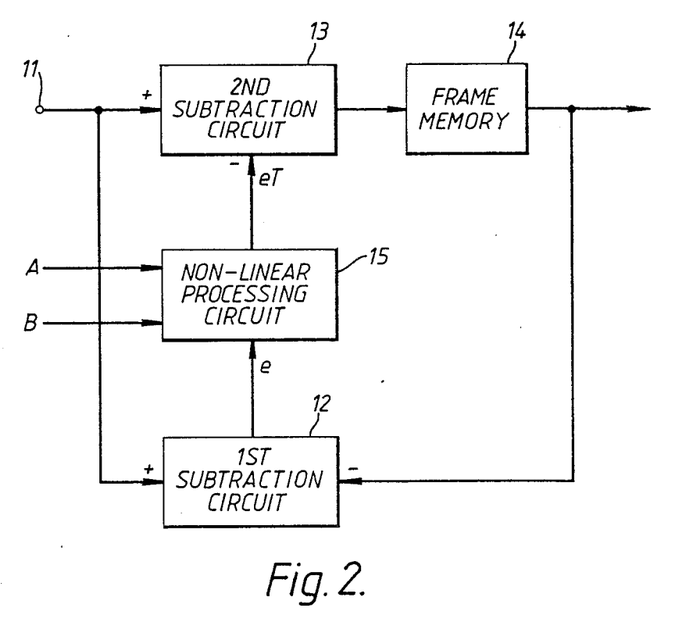
FIG. 2 is a block diagram to show a first embodiment of image track display apparatus of the present invention.

Referring now to FIG. 2, a first embodiment of the the image track display apparatus according to the present invention will be described in detail. In FIG. 2, parts which are not relevant to the control of the apparatus are omitted from the illustration.

In FIG. 2, an input terminal 11 is provided for receiving an image signal X. The input terminal 11 is connected to first input terminals (+) of first and second subtraction circuits 12 and 13. An output terminal of the second subtraction circuit 13 is connected to an input terminal (write input terminal) of a frame memory 14. An output terminal (read out terminal) of the frame memory 14 is connected to a second input terminal (−) of the first subtraction circuit 12. The frame memory 14 produces a delayed image signal Y which is delayed by one frame period from the image signal X on the input terminal 11.

The first subtraction circuit 12 subtracts the delayed image signal Y read out from the frame memory 14 from the image signal X. Thus, the first subtraction circuit 12 outputs a difference signal e between the image signal X and the delayed image signal Y. The output terminal of the first subtraction 12 is connected to the input terminal of a non-linear processing circuit 15. First and second control signals A and B are applied to control input terminals of the non-linear processing circuit 15.

The first control signal A at a L (low) level changes the non-linear processing circuit 15 to a noise reduction mode (referred to an NR mode hereafter). The first control signal A at the H level changes the non-linear processing circuit 15 to a image track display mode. The second control signal B includes a signal component to express the high or low background luminance in the track display mode.

The non-linear processing circuit 15 stores data corresponding to the non-linear characteristics, as shown in FIGS. 3 (a) through 3(g). The non-linear processing circuit 15 selects the characteristics of FIG. 3(a) in the NR mode. The non-linear processing circuit 15 selects the characteristics of FIG. 3(b) or 3(d) or 3(g) when the level of the background luminance signal is high. The non-linear processing circuit 15 selects the characteristics of FIG. 3(c) or 3(e) or 3(f) when the level of the background luminance signal is low.

An output data eT of the non-linear processing circuit 15 is applied to a second input terminal (−) of the second subtraction circuit 13. The second subtraction circuit 13 subtracts the output signal eT from the image signal X. A subtraction signal output from the second subtraction circuit 13 is applied too the frame memory 14. Thus, the subtraction signal is written in the frame memory 14. As a result, the delayed image signal Y responds to the subtraction signal output from the second subtraction circuit 13. According to the signal processing, the S/N of image signal is improved.

Figure 3A:
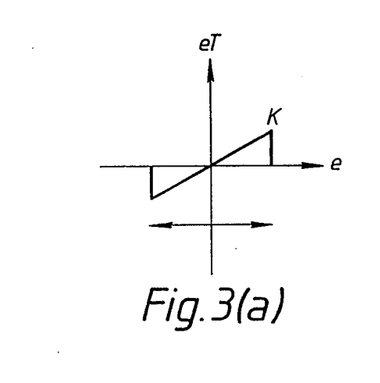
FIGS. 3(a) to 3(g) are coordinate diagrams showing the operation of the first embodiment according to the non-linear processing circuit of FIG. 2.

Now, the operation of the circuit of FIG. 2 will be explained. It is assumed that the NR mode is set in the circuit. In this NR mode, the non-linear processing circuit 15 selects the characteristics, as shown in FIG. 3(a) according to the first control signal A at the L level. Then, the first subtraction circuit 12 subtracts the delayed image signal Y, supplied from the frame memory 14, from the input image signal X. Thus, the first subtraction circuit 12 produces the difference signal e between the signals Y and X.

The delayed image signal Y has a linear characteristic, as long as the image signal X being judged as a stable image. The delayed image signal Y corresponds to a delayed signal of the input image signal X by one frame period or one field period.

The difference signal e is multiplied by K times in the non-linear processing circuit 15. Thus, the non-linear processing circuit 15 produces the signal eT which is the K times of the difference signal e. The signal eT is applied to the second subtraction circuit 13. The second subtraction circuit 13 subtracts the signal eT from the input image signal X.

The subtraction signal output from the second subtraction circuit 13 is applied to the frame memory 14, as described above. As a result, the delayed image signal Y responds to the subtraction signal output from the second subtraction circuit 13. According to the signal processing as described above, the S/N of image signal is improved.

Now, the operation of the circuit of FIG. 2 in the image track display mode will be described. In this mode, the first control signal A is at the H level and the second control signal B corresponds to the state that the luminance of the background image is lower than the moving image signal. The delayed image signal Y (a1 in FIG. 5) which is delayed by one frame period or one field period from the input image signal X, as shown by a2 in FIG. 5, is subtracted from the input image signal X by the first subtraction circuit 12.

Figure 4A:
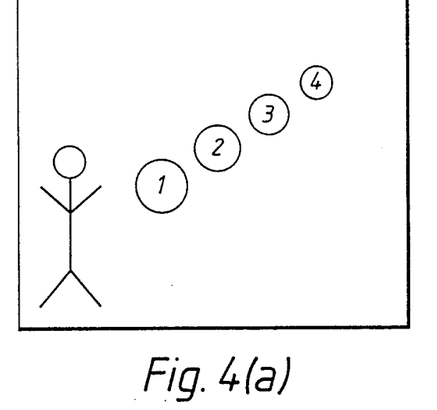
FIGS. 4(a) and 4(b) are schematic diagrams for illustrating the operation of image track display apparatus of the first embodiment.
Figure 4B:
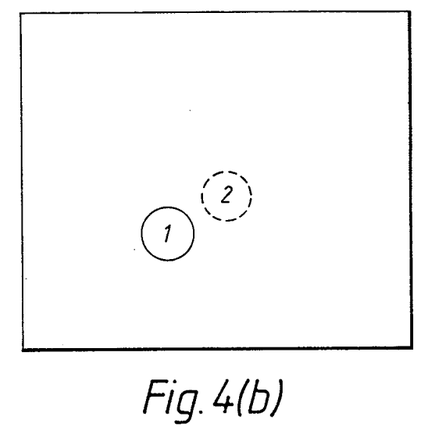
Figure 5A:
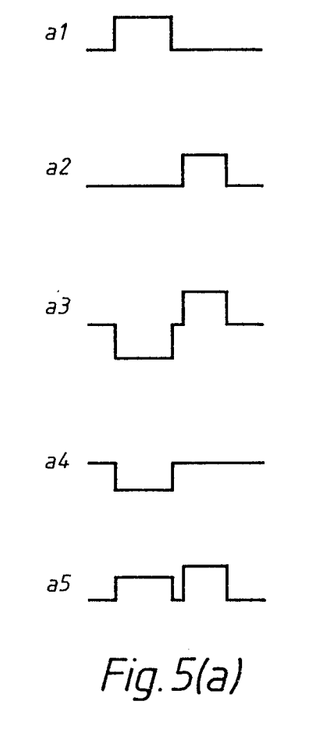

The difference signal e including the low-level and high-level signal components, as shown by a3 in FIG. 5, is applied to the non-linear processing circuit 15. In other words, the first subtraction circuit 12 subtracts the signal a1 from the signal a2, as shown in FIG. 5. The first subtraction circuit 12 outputs a combined signal between inversion signals of the signal a2 and the signal a1. In the state, an image track display, as shown in FIG. 4 (b), is carried out. In FIG. 4(b), a first image (1) and its delayed image (2) are simultaneously displayed on the screen. The frame difference signal e obtained by the first subtraction circuit 12 has a waveform, as shown in FIG. 5(a), since the luminance of the moving image is higher than the background image in the track display mode.

Figure 3B:
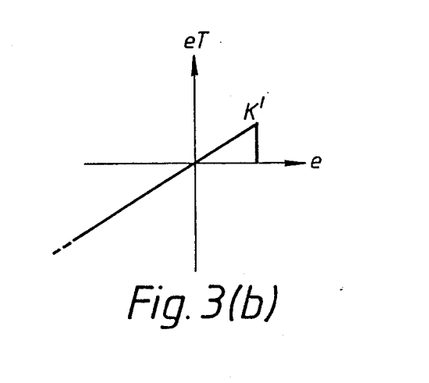

The non-linear processing circuit 15 selects the characteristics, as shown in FIG. 3(b), when the second control signal B is applied. Thus, the difference signal e is processed in accordance with the characteristics, as shown in FIG. 3(b). The non-linear processing circuit 15 selects the characteristic shown in FIG. 3(b) by the second control signal B, and processes the difference signal e in accordance with the characteristics, as shown in FIG. 3(b). Thus, the non-linear processing circuit 15 multiplies the negative component of the frame difference signal e by K' times ($0 < K' \leq 1$), and multiplies the positive component by K' times when the positive component is smaller than a prescribed value. In this time, a noise reduction effect is also obtained. If the positive component is larger that the prescribed value, the positive component is eliminated to zero.

The non-linear processing circuit 15 applies the signal eT, as shown by a4 in FIG. 5, to the second subtraction circuit 13 according to the above processing. The second subtraction circuit 13 subtracts the signal eT from the input image signal X, and outputs a signal, as shown by a5 in FIG. 5(a). The signal a5 is written in the frame memory 14. Then, the delayed image signal Y according to the signal a5 is obtained.

Figure 5B:
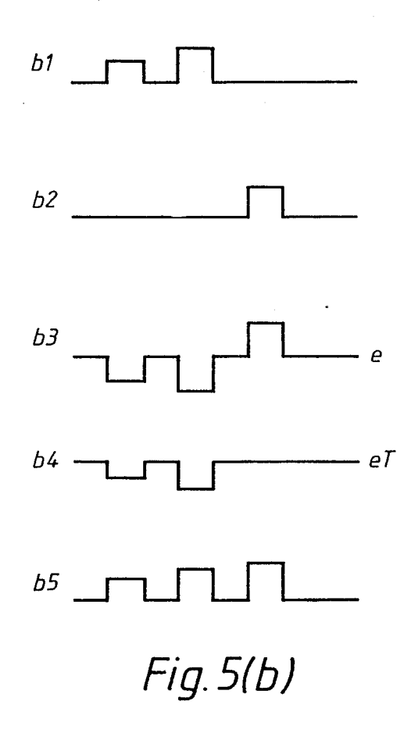

When a third frame signal b2, as shown in FIG. 5(b), is applied to the input terminal 11, the first subtraction circuit 12 subtracts the delayed signal Y of the third frame signal b2 from the image signal X. That is, a signal b1, as shown in FIG. 5(b), is subtracted from the image signal X of the third frame signal b2. Thus, a difference signal e, as shown by b3 in FIG. 5(b), is output from the first subtraction circuit 12. The non-linear processing circuit 15 outputs a signal eT, as shown by b4 in FIG. 5(b), to the second subtraction circuit 13. As the result, a signal, as shown by b5 in FIG. 5(b), is stored in the frame memory 14. By repeating the above operation for every frames, a track of the moving image is displayed, as shown in FIG. 4(a).

Figure 3C:
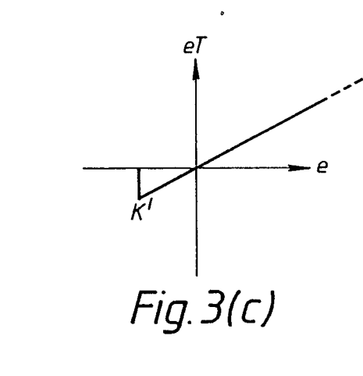

If the luminance of the background image is lower than the moving image, the non-linear processing circuit 2 selects the characteristics, as shown in FIG. 3(c), by the second control signal B. Then, the positive component of the frame difference signal e is multiplied by K' times. If the negative component is larger than the prescribed value, the negative component of the frame difference signal e is multiplied by K' times. If the negative component is smaller than the prescribed value, the negative component is reduced to zero. According to the process, the track display of the moving image is carried out.

Figure 3D:
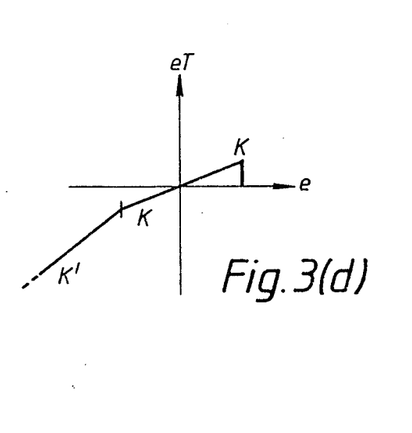
Figure 3E:
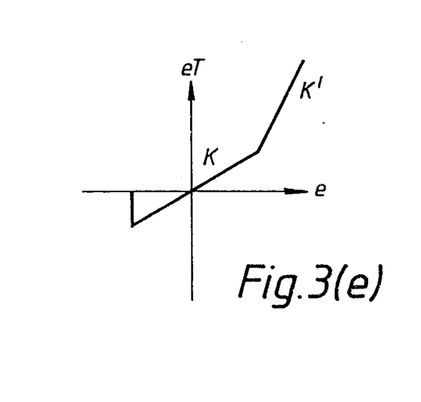
Figure 3F:
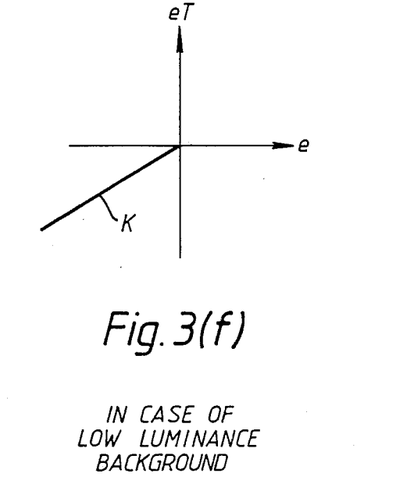
Figure 3G:
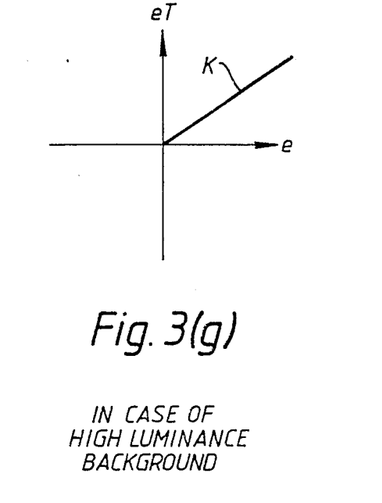

The non-linear processing circuit 15 may be constituted by a PROM (programmable read only memory) with a non-linear characteristics between its input and output. When the characteristics, as shown in FIG. 3(b), is selected, the negative component of the frame difference signal e is multiplied by K times, irrespective of the value of the negative component. When the characteristics, as shown in FIG. 3(c), is selected the positive component of the frame difference signal e is multiplied by K times, irrespective of the value of the positive component. The prescribed value can be set to zero, when the characteristics, as shown in FIG. 3(b) or 3(c) is selected. Furthermore, a characteristic having a variable coefficient, as shown in FIG. 3(d), may be employed.

Figure 6:
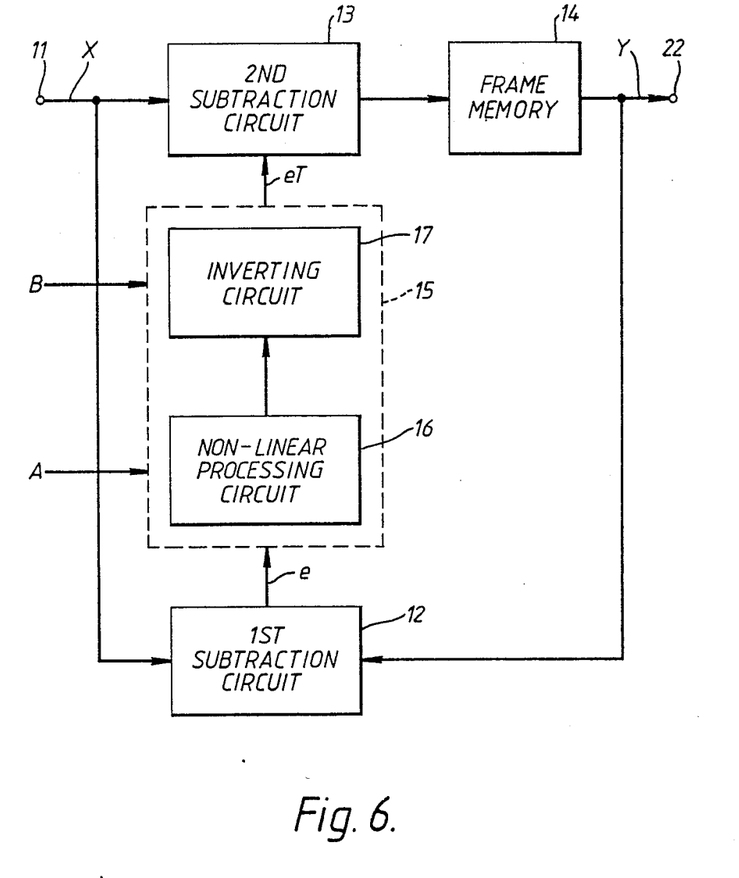
FIG. 6 is a block diagram showing a modification of the first embodiment.

When making the coefficient K in the NR mode and the coefficient K' in the track display mode to $K < K'$, the residual image in the NR mode can be suppressed. Also, the track in the track display mode an be displayed well. The non-linear processing circuit 15 may be constituted, for example, by a non-linear characteristic circuit 16 and an inversion circuit 17, as shown in FIG. 6. The non-linear characteristic circuit 16 may store only the characteristics as shown in FIG. 3(b). Then, the signal eT output from the non-linear characteristic circuit 16 may be inverted by the second control signal B.

Further, the second control signal B may be generated by the manual operation, or may be detected from the luminance level of the background image and the difference signal e. The signal processing may be carried out in the field unit, by employing a field memory in place of the frame memory.

Figure 7:
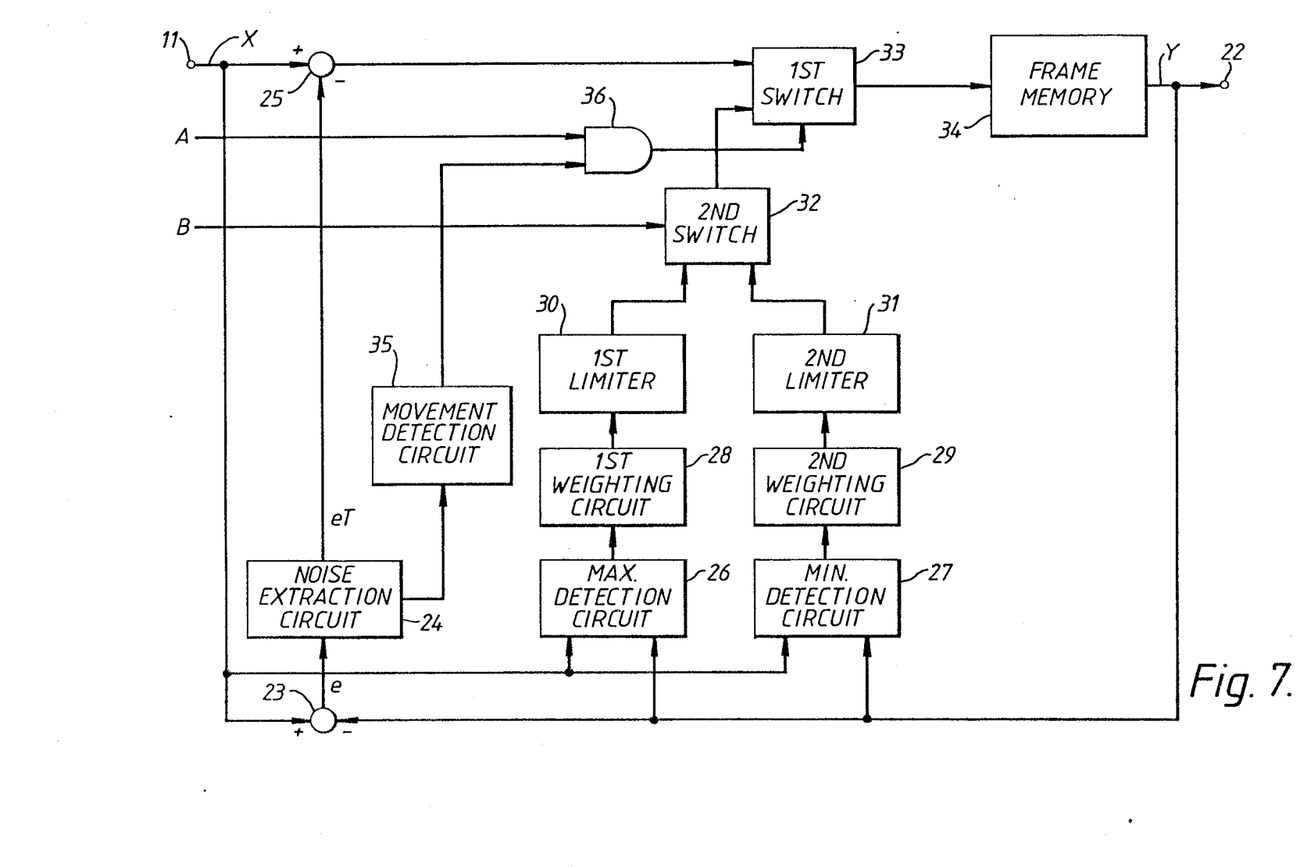
FIG. 7 is a block diagram showing a second embodiment of the track display apparatus according to the present invention.
Figure 8A:
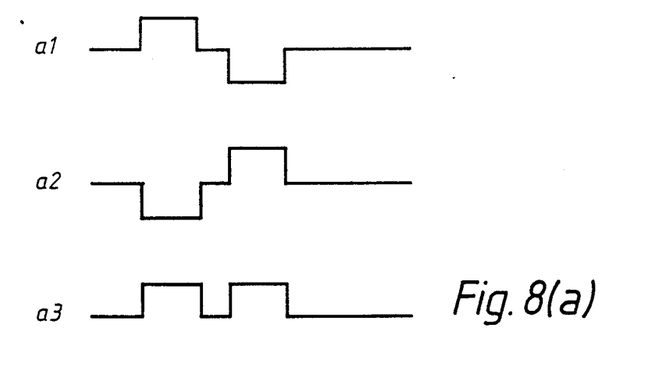
Figure 8B:
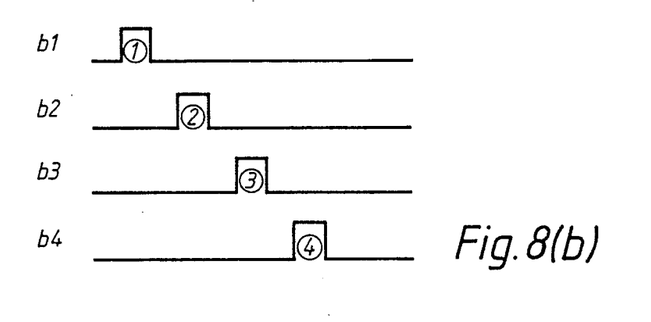
Figure 8C:
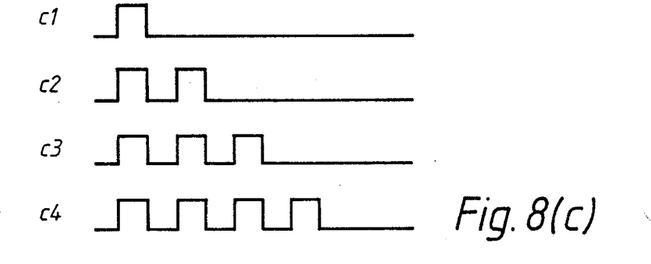

Referring now to FIGS. 7 and 8, a second embodiment of the image track display apparatus according to the present invention will be described.

In FIG. 7, an input terminal 11 for receiving the image signal X is connected to first input terminals (+) of first and second subtraction circuits 23 and 25. The input terminal 11 is further connected to first input terminals of a maximum value detection circuit 26 and a minimum value detection circuit 27. The output terminal of second subtraction circuit 25 is connected to a first input terminal of a first switch 33. The output terminal of the first switch 33 is connected to a write terminal of a frame memory 34. The read terminal of the frame memory 34 is connected to a second input terminal (−) of the first subtraction circuit 23 and second input terminals of the maximum value detection circuit 26 and the minimum value detection circuit 27.

The first subtraction circuit 23 subtracts a delayed image signal Y output from the frame memory 34 from the input image signal X. Thus, the first subtraction circuit 23 produces a difference signal e. An output terminal of the first subtraction circuit 23 is connected to an input terminal of a noise extraction circuit 4. An output terminal of the noise extraction circuit 4 is connected to a second input terminal (−) of the second subtraction circuit 25 and an input terminal of a movement detection circuit 35.

A first control signal A and an output of the movement detection circuit 35 are applied to an AND gate 36. An output terminal of the AND gate 36 is connected to a control input terminal of the first switch 33. An output terminal of the maximum value detection circuit 26 is connected to an input terminal of a first weighing circuit 28. The first weighting circuit 28 multiplies signal by $M(0 < M < 1)$ times. An output terminal of the first weighting circuit 28 is connected to an input terminal of a first limiter 30, and an output terminal of the first limiter 30 is connected to a second switch 32. An output terminal of the minimum value detection circuit 27 is connected to a second weighting circuit 29. The second weighting circuit 29 multiplies signal by $((1+(1-M))$ times. An output terminal of the second weighting circuit is connected to an input terminal of second limiter 31, and an output terminal of second limiter 31 is connected to the second switch 32. An output side terminal of the second switch 32 is connected to a second input terminal of the first switch 33.

The first control signal A applied to the AND gate 36 changes the circuit to the NR mode when the signal A is at the L level. The first control signal A changes the circuit to the image track display mode when the signal A is at the H level. The second control signal B applied to the second switch 32 includes signal components representing the high or low luminance of the background image in the track display mode.

The operation of the circuit of FIG. 7 will be described below. When the NR mode is set and the first control signal A at the L level is supplied to the AND gate 36, the output of the AND gate 36 controls first switch 33 so that its first input terminal is activated. At this time, the first subtraction circuit 23 subtracts the delayed image signal Y supplied from the frame memory 34 from the input image signal X. The difference signal e obtained by the first subtraction circuit 23 is multiplied by K times in the noise extraction circuit 4. The multiplied signal eT output from the noise extraction circuit 24 is applied to the second subtraction circuit 25. The second subtraction circuit 25 subtracts the signal eT from the input image signal X. An output of the second subtraction circuit 25 is transmitted to the frame memory 34 through the first switch 33.

Therefore, the difference signal obtained by the second subtraction circuit 25 is written in the frame memory 34. The delayed image signal Y read from the frame memory 34 is applied to a display device (not shown). Such a signal processing is repeated for every frame. Accordingly, the S/N of an image signal is improved.

Now, the operation of the circuit in the image track display mode will be described. In this mode, the first control signal A is at the H level to indicate the track display mode. The input terminal 11 successively receives image signals b1 to b4, as shown in FIG. 8(b). The difference signal e is applied to the noise extraction circuit 4. When the noise extraction circuit 4 detects that the difference signal e is larger than the set value, a detection signal is applied to the movement detection circuit 35. The movement detection circuit 35 applies the H level signal to the AND gate 36 in response to the detection signal. Since the inputs of the AND gate 36 are at the H level together, the H level signal of the movement detection circuit 35 is applied to the first switch 33 through the AND gate 36.

The H level signal of the movement detection circuit 35 controls the first switch 33 so that its second input terminal connected to the second switch 32 is activated. Thus, the second switch 32 is coupled to the frame memory 34 through the first switch 33.

The second switch 32 selects the outputs of the first limiter 30 and the second limiter 31 according to the second control signal B. The first limiter 30 outputs a moving image signal when the luminance level of the background image is low. The second limiter 31 outputs a moving image signal when the luminance level of the background image is high. Thus, when the luminance level of the background image is low, or in other words, when the luminance level of a moving image is high, the maximum value detection circuit 26 compares the input image signal X with the delayed image signal Y. Then, the maximum value detection circuit 26 detects an image signal with the maximum luminance. The picture element with the maximum luminance is judged as a moving image.

According to the maximum value detection circuit 26, the image signal of the second frame is subtracted from the delayed image signal of the first frame stored in the frame memory 34. Thus, a signal, as shown by a1 in FIG. 8(a), is obtained. After that, the image signal of the first frame is subtracted from the image signal of the second frame. Thus, a signal, as shown by a2 in FIG. 8(a), is obtained.

The maximum value detection circuit 26 outputs a signal, as shown by a3 in FIG. 8(a), by processing the detection signals a1 and a2. The image signal obtained by the maximum value detection circuit 26 is multiplied by M times in the first weighting circuit 28. Thus, the luminance level of the image signal is decreased. The output of the first weighting circuit 28 is successively applied to the first limiter 30 for every frame. The first limiter 30 limits the level of the image signal so that the image signal is kept to the level higher than the black level. The image signal output from the first limiter 30 is applied to the second switch 32. At this time, since the second control signal B indicates that the luminance level of the background image is low, an output image signal from the first limiter 30 is introduced to the first switch 33 through the second switch 32. The same image signal is input in the frame memory 34 through the first switch 33. At this time, a signal c1, as shown in FIG. 8(c), stored in the frame memory 34 is rewritten to a signal c2. When the signal c2 is read from the frame memory 34 and input in the display device as the image signal Y, an image track with the movement from (1) to (2), as shown in FIG. 4(b), is displayed.

Thus, during the operation for input image signals b1 to b4, the frame memory 34 is rewritten one after another from the signal c1 to the c4. The track with the movement, as shown by (1), (2), (3) and (4) in FIG. 8(b), is displayed on the display device. In the above explanation, the luminance level is lowered by weighting the maximum value detection signal by M times, however it may be good if it is designed to raise the luminance. In this case, the first limiter 30 carries out the level restriction to the weighted image signal from the first weighting circuit 28 so that the the weighted image signal is kept lower than 100% white level.

In the above explanation, the case in which the level of the moving image is higher than the luminance level of the background image is described. To be discussed now is the case in which the moving image is lower than the luminance of the background image. In the case in which that the luminance of the background image is high an output signal of minimum value detection circuit 27 is employed. In this case, a minimum value signal is detected from signals a1' and a2' (inversion signals of signals a1 and a2 in FIG. 8(a)) obtained by the subtraction between first and second frames, and a signal a3' (inversion signal of signal a3) is formed. This signal a3' is weighted by $(1+(1-M))$ times by the second weighting circuit 29, the luminance level is increased for every frame, and input in the second limiter 31. The second limiter 31 carries out the level restriction for the weighted image signal by $(1+(1-M))$ times, and applies the weighted image signal to the second switch 32. At this time, since it is indicated that the second control signal B applied to the second switch 32 has the luminance of the background image at the H level, the second switch 32 has been switched to the second limiter 31. Therefore the weighted image signal by $(1+(1-M))$ times is applied to the frame memory 34 through the second switch 32 and the first switch 33.

By being repeated at every frame, the track of a moving image is displayed as an image to change from the illustration (1) to (2). In this case the image signal is weighted by the $(1+(1-M))$ times in the weighted circuit 29 so that the track signal does not exceed the luminance level of the background image or 100% white level.

In the second embodiment, the second switch 32 is controlled by the second control signal B, but it may be controlled by the manual operation, and the luminance of the background image signal and changeover signal from the difference signal may be detected. It is without saying that the memory to store and image signal may be good by the field memory or frame memory.

As described above, according to the present invention, there is displayed the track of a moving image utilizing the noise reduce circuit, a special circuit for the track display of a moving image is not required, and the circuit configuration is simple.

As described above, the present invention can provide an extremely preferable image track display apparatus.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. Image track display apparatus comprising:
   means for receiving an image signal;
   memory means for delaying the image signal by at least one vertical scanning period;
   a first subtraction means for taking a first difference signal between the image signal and the delayed image signal, the first difference signal including first and second polarity components;
   a non-linear processing means for multiplying one polarity component of the first difference signal by K times $(0<K<1)$ and for reducing the other polarity component of the first difference signal to the zero value when the other polarity component exceeds a prescribed value;
   a second subtraction means for taking a second difference signal between the output signal of the non-linear processing means and the image signal; and
   means for displaying the delayed image signal obtained through the memory means.

2. Image track display apparatus of claim 1 wherein the non-linear processing means includes means for storing specified processing data to process the image signal and means for selectively inverting the processing data obtained from the data storing means and for processing the first difference signal on the basis of the inverted data of the specified processing data.

3. Image track display apparatus of claim 1 wherein the non-linear processing means includes linear means for processing a negative component of the first difference signal when the luminance level of the moving image is higher than the background image and for processing a positive component of the first difference signal when the luminance level of the moving image is lower than the background image.

4. Image track display apparatus comprising:
   means for receiving an image signal;
   memory means for delaying the image signal by at least one vertical scanning period;
   a first subtraction means for taking a first difference signal between the image signal and the delayed image signal;
   a first weighting means for weighting the first difference signal by K times when the first difference signal is lower than a prescribed value;
   a second subtraction means for taking a second difference signal between the K times weighted signal and the image signal;
   a first detection means for detecting the maximum value by comparing the image signal with the delayed image signal and for weighting the maximum signal by M times when the first difference signal is larger than the prescribed value;
   a second detection means for detecting the minimum value by comparing the image signal with the delayed image signal and for weighting the minimum value by $(1+(1-M))$ times when the first difference signal is larger than the prescribed value;
   a first selection means for selecting one of the M time signal and the $(1+(1-M))$ time signal;
   a second selection means for selecting one of the selected signal and a subtraction signal between the image signal and the K time signal of the first difference signal and for applying the selected signal to the memory means; and
   means for displaying the delayed image signal obtained through the memory means.

5. Image track display apparatus of claim 4 further comprising means for selecting the maximum value when the luminance level of moving image is higher than the background level and selecting minimum value when the luminance level of moving image is lower than the background level.

* * * * *